United States Patent [19]

Iwai

[11] Patent Number: 4,792,753
[45] Date of Patent: Dec. 20, 1988

[54] LOCAL AREA NETWORK PROTOCOL ANALYZER
[75] Inventor: Kiyoshi Iwai, Tokyo, Japan
[73] Assignee: Nippon Board Computer Co., Ltd., Tokyo, Japan
[21] Appl. No.: 16,280
[22] Filed: Feb. 19, 1987
[30] Foreign Application Priority Data Feb. 21, 1986 [JP] Japan .................................. 61-36797

[51] Int. Cl.⁴ ........................ G01R 31/02; H04J 3/16; H04J 3/02
[52] U.S. Cl. .............................. 324/73 R; 340/825.05; 340/825.07; 370/86; 370/94
[58] Field of Search .......................... 324/73 R, 57 R; 340/825.05, 825.07; 370/86, 88, 89, 94

[56] References Cited
U.S. PATENT DOCUMENTS

4,679,191 7/1987 Nelson et al. ......................... 370/94

Primary Examiner—Ernest F. Karlsen
Attorney, Agent, or Firm—Pearne, Gordon, McCoy & Granger

[57] ABSTRACT

A local area network protocol analyzer for analyzing packets or signal series running in a coaxial cable of a local area network and comprising a code/decoder to separate a packet received from the coaxial cable into a clock signal and a serial data signal, a receive signal processing section to convert the serial data signal into parallel data, a receive memory section to store the parallel data from the receive signal processing section in a receiving data memory section thereof and an output/input section to analyze and indicate the parallel data in the receiving data memory section and to input instruction signal to instruct the sections therefrom, the receive signal processing section including a control counter for controlling an address where the parallel data is stored in the receiving data memory and being counted up for every storing of the parallel data and the receive memory section including a managing data memory section under control of which a memory address pointer indicating where the packets are stored is set, a packet length is measured and a packet interval is measured.

10 Claims, 6 Drawing Sheets

MAX LOAD THIS PERIOD : 8.9630% (896kbps )
MIN LOAD THIS PERIOD : 0.1190% (11.9kbps)
AVE LOAD THIS PERIOD : 2.7652% (277kbps )

FIG.9

LOCAL AREA NETWORK PROTOCOL ANALYZER

BACKGROUND OF THE INVENTION

A prior art protocol analyzer utilizes low speed RS 232 C process and has a transmission speed of only 1M bps (bit per second) and therefore cannot be applied to such local area networks of Ethernet, Token Ring or MAP (manufacturing automation protocol) having a transmission speed of 5~10M bps.

Furthermore, the prior art analyzer cannot analyze a packet length and a packet time interval, so measurements of effectiveness are not made. Thus, the prior art analyzer cannot measure a traffic load of the local area network, which indicates a circuit load capacity. It is important to the user because it indicates whether the local area network system has remaining capacity.

In addition thereto, since the prior art analyzer has a fixed LSI circuit exclusively for Ethernet only, it cannot receive data other than that from Etherent.

Also, the prior art analyzer is large in size and in weight, which causes the use of the analyzer to be troublesome.

Finally, the prior art analyzer has no function of preventing an occurrence of collision and of checking a CRC value of a packet.

SUMMARY OF THE INVENTION

Accordingly, it is a principal object of the invention to provide a local area network protocol analyzer adapted to receive all the packets running on a local area network.

It is another object of the invention to provide a local area network protocol analyzer adapted to store data received from the network and at the same time store such factors as a packet time interval and a packet length.

It is a further object of the invention to provide a local area network protocol analyzer adapted to effectively measure a traffic load of the local area network.

It is a further object of the invention to provide a local area network protocol which can have a circuit check function and a collision occurrence detection function.

In accordance with the invention, there is provided a local area network protocol analyzer for analyzing packets running in a coaxial cable of a local area network, said analyzer comprising;

a code/decoder to separate a packet received from the coaxial cable into a clock signal and a serial data signal;

a receive signal processing section to convert the serial data signal into parallel data;

a receive memory section to store the parallel data from the receive signal processing section in a receiving data memory section thereof;

a receive memory control section for controlling said code/decoder, said receive signal processing section and said receive memory section;

an output/input section to analyze and indicate the parallel data in the receiving data memory section and to input instructions to control the sections therefrom.

a main control section for controlling a total management of the analyzer including said output/input section;

said receive signal processing section including a control counter for controlling an address where the parallel data is stored in the receiving data memory and being counted up for every storing of the parallel data;

and said receive memory section including a managing data memory section under control of which a memory address pointer indicating where the packets are stored is set, a packet length is measured and a packet interval is measured whereby the data from said receiving data memory section is analyzed in view of the time factor from said managing data memory section.

BRIEF DESCRIPTION OF THE DRAWINGS

The above and other objects and features of the invention will be apparent from the description of embodiments taken along with reference to the accompanying drawings in which.

DETAILED DESCRIPTION OF THE EMBODIMENTS

Figure 1:
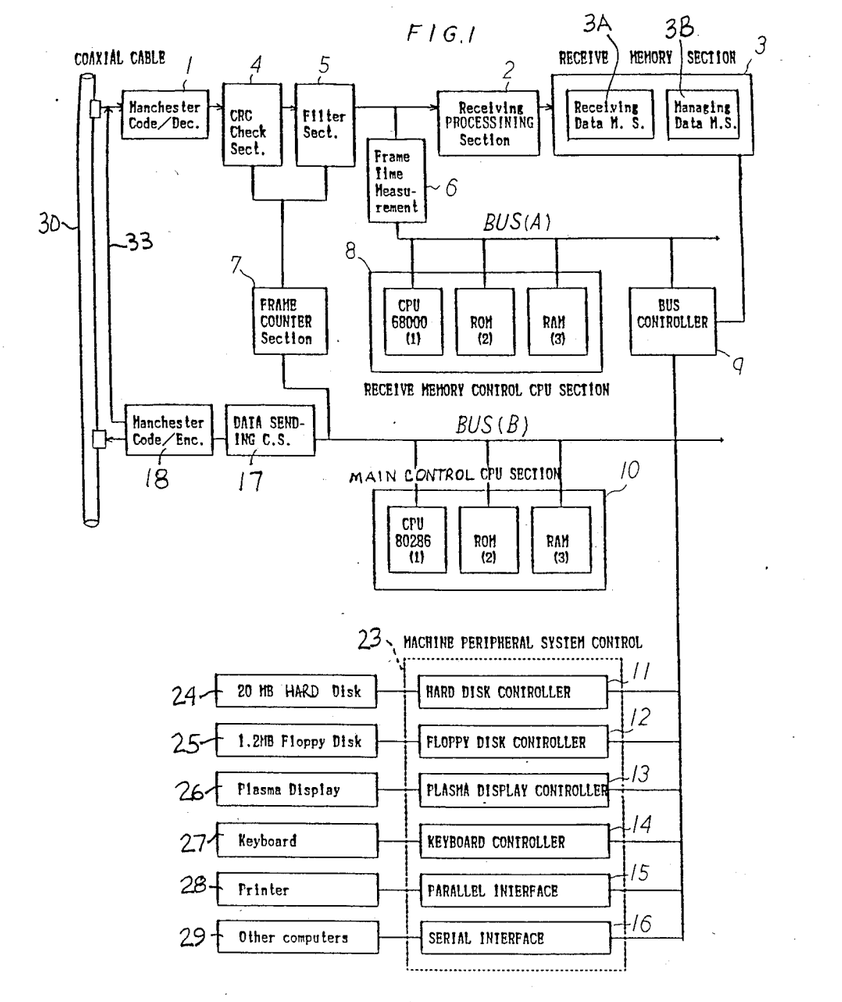
FIG. 1 is a schematic block diagram of a local area network protocol analyzer in accordance with one embodiment of the invention.

Referring now to FIG. 1, there is shown a local area network (LAN) protocol analyzer applied to an Ethernet system and constructed in accordance with one embodiment of the invention.

Figure 2:
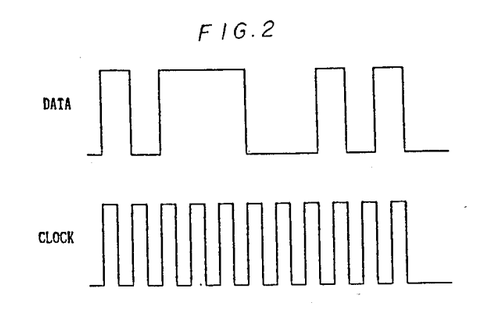
FIG. 2 illustrates a serial data signal and a clock signal separated by a code/decoder.

A signal series or packet running in a coaxial cable 30 is encoded by Manchester code. A Manchester code/decoder 1 is provided in an exchangeable manner together with software packages used to sequentially receive each of the packets through a transceiver to separate it into a clock signal and a serial data signal as shown in FIG. 2. The code/decoder 1 is interchangeable according to the type of network, such as Ethernet, Token Ring, or MAP.

Figure 10:
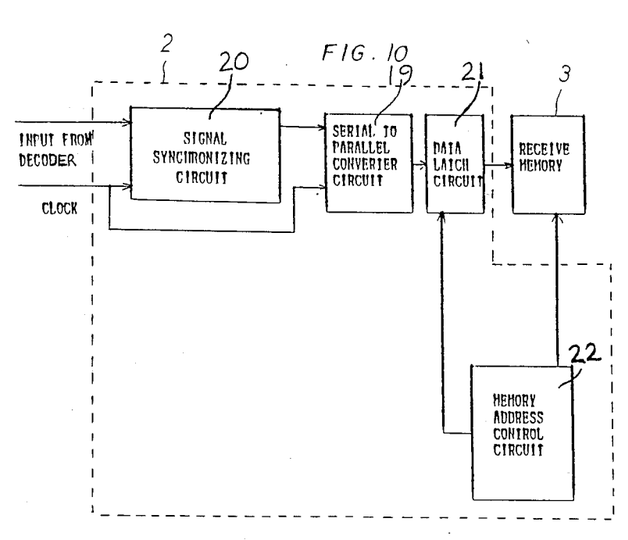
FIG. 10 is a block diagram of an example of a receive signal processing section used in the invention.

A receive signal processing section 2 which receives the signals from the code/decoder 1 (via CRC check section 4 and filter section 5, discussed below) is provided and as shown in FIG. 10, includes a serial to parallel converter to convert 19 the serial data signal through a signal synchronizing circuit 20 into parallel data of 8 bit length. The parallel signal is latched by a data latch circuit 21 and stored in a receive memory section 3 through the data latch circuit 21 while controlled by a memory address control circuit 22.

The receive memory section 3, which may be 12M bytes, includes a receiving data memory section 3A of 10 3B and a managing data memory section M bytes as shown in FIG. 1. As aforementioned, the receiving data memory section 3A of the receive memory section 3 sequentially stores the data signals from the receive signal processing section 2 under control of the memory address control circuit 22 (FIG. 10). The managing data memory section 3B of the receive memory section 3 will be described later.

Figure 9:
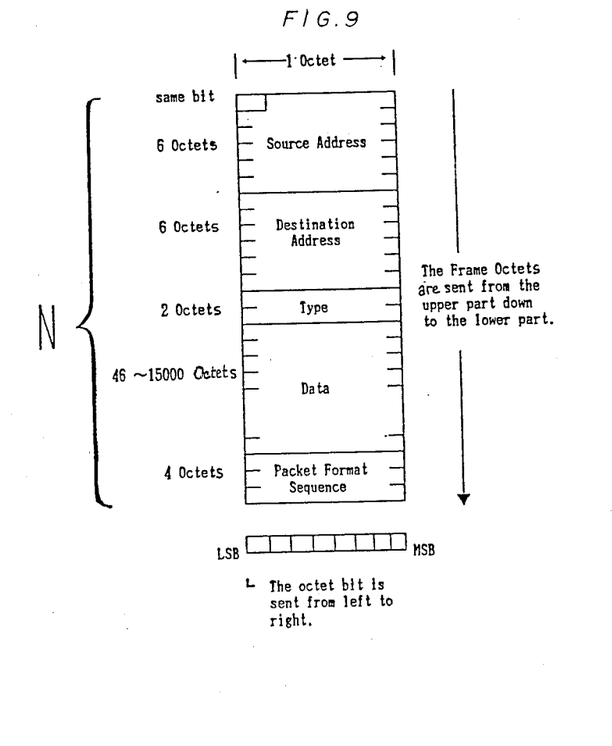
FIG. 9 illustrates an Ethernet packet format.

The analyzer also comprises a CRC check section 4 and a filter section 5 as shown in FIG. 1. The CRC check section 4 functions as an error detector to check the packets received from code/decoder 1. An example of the error check is shown in FIG. 9 illustrating the Ethernet packet sequence format separated into five fields: Source Address-6 Octets. Destination Address-6 Octets, Type—2 Octets. Data—46~15000 Octets and Preamble (packet format sequence)-4 Octets. Since 1 Octet is equal to 8 bytes, the Preamble is of 32 bytes. As described later, an address pointer stored in the managing data memory section 3B indicates a packet length (frame length) N shown in FIG. 9. The Preamble of 32 bytes which is provided at the end of the packet corresponds to an error check code of the packet. A CRC value (cyclic redundancy check value) of the packet format sequence field can be defined by the following expression as a general function of the fields other than the packet format sequence;

$$G(X)=X^{32}+X^{26}+X^{23}+X^{22}+X^{16}+X^{12}+X^{11}+X^{10}+X^8+X^7+X^5+X^4+X^2+X+1$$

The CRC check section 4 can check a transmission error of the packet by using the expression. The filter section 5 receives the packets from the CRC check section 4 and serves to control selection of packets in accordance with filter patterns specified by a user. This is accomplished by comparing the pattern of data through the filter sections with the bit pattern set in the filter section 5 to selectively receive the specified packet. The filter section 5 may comprise 6-channel filters each of which has a maximum length of 128 bits. After matching any of the received data-bit patterns on the six set channels, the data is taken in. Once the user sets the filtered data and the filtered pattern, these data are maintained until they are rewritten. The user can also use the filter section as a Start trigger mode or a Stop trigger mode. In the start trigger mode, signals will not be received until the user obtains the matching pattern. In the stop trigger mode, the system stops receipt of the signals when the user obtains a matched pattern.

The CRC check section 4 and filter section 5 may, of course, be omitted and the serial data passed directly from code/decoder 1 to receiving processing section 2.

Figure 5:
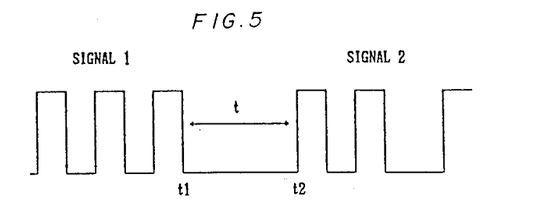
FIG. 5 illustrates a packet time interval measured by the invention.
Figure 6:
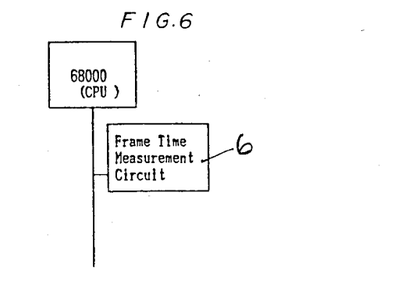
FIG. 6 is a block diagram for measuring the packet time interval.
Figure 7:
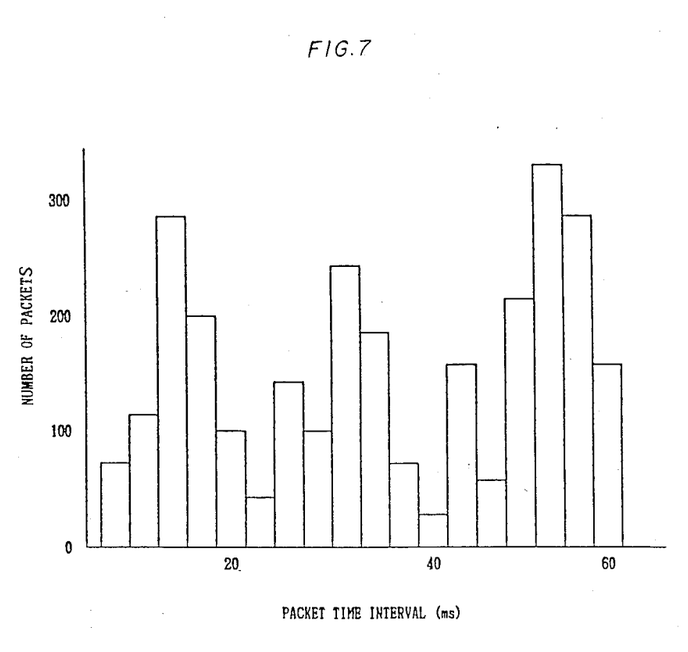
FIG. 7 illustrates the number of packets relative to the packet time intervals measured by the invention.

The analyzer also comprises a packet time interval measurement section 6 which monitors packets as they pass from filter section 5 to receiving processing section 2 and serves to measure the packet time interval as shown in FIG. 5. The thus measured packet time interval, together with pointers indicating where the packets are stored in receiving data memory section 3A, are stored in the managing data memory section 3B of the receive memory section 3. A packet counter section 7 is also provided. It monitors the operation of CRC check section 4 and filter section 5 and serves to count the number of received packets as shown in FIG. 7.

A receive memory control CPU section 8 may include a 16 bit microprocessor of high performance such as a 68000, for example. The receive memory control CPU section 8 comprises (1) CPU, (2) ROM and (3) RAM. The receive memory control CPU section 8 serves to control the sections 1 to 7 for receiving and memorizing the packets through a bus (A).

A main control CPU section 10 comprises (1) CPU 80286, (2) ROM and (3) RAM. The main control CPU section 10 serves to control the total management of the protocol analyzer and also control all softwares. The main control CPU section 10 reads and writes the data in the receiving data memory section 3A of the receive memory section 3 while referring to the managing data from the managing data memory section 3B of the receive memory section 3 through a bus (B).

A bus controller section 9 serves to control so as to switch the buses (A) and (B) for the receive memory control CPU section 8 and the main control CPU section 10 and to switch an access from the CPU sections 8 and 10 to the receive memory section 3.

An output/input section 23 is provided and comprises a hard disk controller 11 which controls a 20M byte hard disk drive 24, a floppy disk controller 12 which controls a 1.2M byte floppy drive 25, a plasma display controller 13 which controls a display on a plasma display 26, a keyboard controller 14 which controls a keyboard 27, a parallel interface 15 based on a centronics interface which controls a printer 28, and a serial interfac 16 based on RS 232 C interface, which serves to supply the signals to other computers 29 or other serial ports (not shown). The output/input section 23 serves to indicate the result of analyzing the data from the receiving data memory section 3A in view of the packet time interval while referring to the managing data such as the address pointers from the managing data memory section 3B.

In the illustrated embodiment, there is provided data or circuit testing means which comprises a data sending control section 17 connected to the bus (B) to serve to send the data from the analyzer into the coaxial cable 30 via a Manchester code/encoder 18 which serves to encode the data from the data sending control section 17 into Manchester code before it is sent back to the coaxial cable 30 or via line 33 to code/decoder 1. It will be noted that the data from the analyzer are prepared and edited by the main CPU section 10. The user can send a maximum of 4K bit packet to the coaxial cable 30, and thus into the network or looped back to the protocol analyzer via line 33 to code/decoder 1. This is important because it prevents occurrence of collisions. Thus, it will be noted that the system of the illustrated embodiment controls the data output from the protocol analyzer to the coaxial cable 30. This aids in testing whether the circuit system can normally receive the signals or not and also whether there is a disconnection of the circuit system or not.

Figure 3:
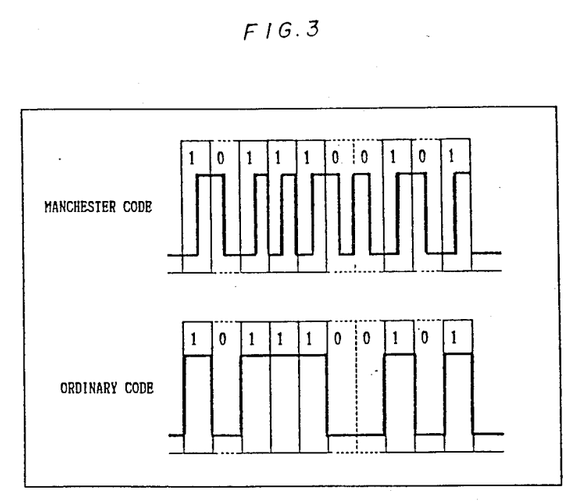
FIG. 3 illustrates signal series encoded by Manchester code and ordinary code, respectively.

In operation, the packets or signal series coded by the Manchester code are received through the transceiver by the Manchester code/decoder 1. As shown in FIG. 3, the Manchester code system has two codes of "1", which indicates the voltage level of the signal changes from "Lo" to "Hi", and "0" which indicates the voltage level of the signal changes from "Hi to "Lo". The Manchester code/decoder 1 decodes the packet so as to separate it into the clock signal and the data signal as shown in FIG. 2. The thus received and separated signals are received through the CRC check section 4 and the filter section 5 by the receive signal processing section 3. Any transmission error of the received packet is detected by the CRC check section 4 as described in detail with respect to the CRC check section 4. There passes through the filter section 5 only the data pattern specified by the user. As aforementioned, the serial data signal is converted into parallel signals by the receiving signal processing section 2 and stored in the receiving data memory section 3A of the receive memory section 3 while the managing data such as the address pointer, the packet length and the packet time interval measured by the packet time interval measurement section 6 are stored in the managing data memory section 3B of the receive memory section 3.

Figure 8:
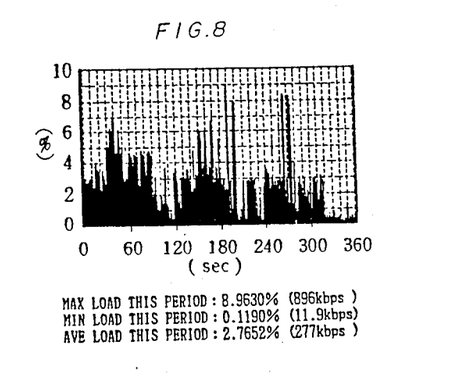
FIG. 8 illustrates an example of circuit load capacity measured by the invention.

It should be noted that the managing data are important for analyzing the packet or the frame of signals. FIG. 5 shows the packet time interval t which indicates the time interval between $t_1$ where one of the packets (signal 1) terminates and $t_2$ where the adjacent packet (signal 2) starts. The address pointers stored by the managing data memory section 3B and indicating where the corresponding packets are stored by the receiving data memory section 3A serve to analyze the data from the receiving data memory section. More particularly, by sequentially reading out the address pointers from the managing data memory section 3B the corresponding data from the receiving data memory section can be analyzed, which causes the speed of analyzing the data to be improved. Finally, it is most important for the analyzer to be able to analyze the packets so as to measure the traffic load. In FIG. 7, the abscissa shows the packet time interval which is measured by the packet time interval measurent section 6 and stored in the managing data memory section 3B while the ordinate shows the number of packets which is counted by the packet counter section 7. The figure shows the distribution of packets. From the figure will be noted the traffic characteristics (transmission frequency). Referring now to the traffic characteristics of the Ethernet, let it be supposed that the data of m megabyte is transmitted during the time interval of T seconds. Given a channel capacity of 10M bps, input traffic may be expressed in terms of the channel capacity, m/10T. Supposing that m/T is equal to n M bps, the traffic load is then by n/10. FIG. 8 shows an example of load capacity which indicates a result of one second sampling which is recorded over 6 minutes. As noted from this figure, the highest traffic load is less than 10% of load capacity in the Ethernet having a transmission capacity of 10M bps. This means the network is essentially unloaded. Thus, it will be noted that the analyzer can analyze the received data in view of such factors as packet time interval and number of packets so as to measure various characteristics such as the effectiveness of the network or the status of load.

Figure 4A:
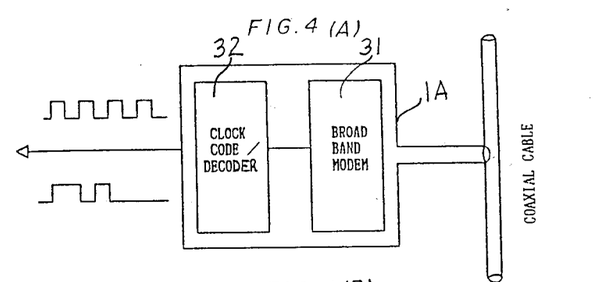
FIGS. 4A and 4B show code/decoders used for a MAP based local area network system and for a token Ring local area network system, respectively.
Figure 4B:
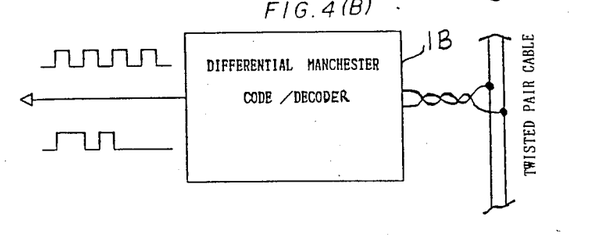

FIGS. 4A and 4B show other code/decoder sections 1A and 1B, respectively applied to a MAP system and a Token Ring system, respectively. In code/decoder section 1A of FIG. 4A, a broad band modem 31 is provided to convert a broad band modem signal (analog signal) into a digital signal and then a code/decoder 32 decodes the digital signal into ones shown in FIG. 2. The later treatment of them is identical to the embodiment of FIG. 1. In code/decoder section 1B of FIG. 4B, a differential Manchester code/decoder decodes a signal of Manchester differential code into ones shown in FIG. 2. Also, the later treatment of them is identical to the embodiment of FIG. 1.

It should be noted that one of the most important features of the invention is the use of a separate code/decoder 1 and receiving signal processing section 2 formed of LSI and the exchangeable provision of the code/decoder section 1 to decode the signal, which means the analyzer can be applied to various systems of local area networks, such as Ethernet, MAP and Token Ring. Another important feature of the invention is the separation of the receive memory section 3 into the receiving data memory section 3A and the managing data memory section 3B and the separation of the control section into the receive memory control CPU section 8 and the main control CPU section 10. This aids in processing the packets at higher speed by separating the receipt and analysis of the packet. Accordingly, this means the analyzer can be applied to systems having substantially higher transmission speed. Also, since the managing data memory section 3B stores such factors as packet time interval and packet length as well as address pointers, the data can be read out at higher speed for analyzing them. In addition thereto, the load capacity can be measured by analyzing the data in view of the packet time interval. A further important feature of the invention is the provision of the CRC check section. This aids in detecting the transmission error of the packets and detecting collision occurrence. Finally, a further important feature of the invention is the provision of the data sending control section 17 and the code/encoder section 18. This aids in testing whether the circuit system is operating normally or not and whether there is a disconnection of the circuit system or not.

It should be noted that the analyzer can be made compact and transportable which is more convenient for use thereof.

Although some embodiments of the invention have been illustrated and described with reference to the accompanying drawings, it will be understood by those skilled in the art that they are by way of example, and that various changes and modifications may be made without departing from the spirit and scope of the invention, which is intended to be defined only by the appended claims.

What is claimed is:

1. A local area network protocol analyzer for analyzing packets running in a coaxial cable of a local area network, said analyzer comprising:
an interchangeable code/decoder, said code/decoder being operatively connected to said coaxial cable and adapted to decode a packet received from the coaxial cable into a clock signal and a serial data signal;
a receive signal processing section, said receive signal processing section receiving the serial data signal and adapted to convert the serial data signal into parallel data;
a receive memory section having a receiving data memory section, said receiving data memory section receiving and storing the parallel data from the receive signal processing section;
a receive memory control section, said receive memory control section controlling said code/decoder, said receive signal processing section and sid receive memory section;
a first bus, said first bus communicating with said receive memory control section;
a bus controller, said bus controller communicating with said first bus and said receive memory section;
a second bus, said second bus communicating with said bus controller, wherein said bus controller selectively allows communication between the buses and between the receive memory section;
an output/input section, said output/input section being connected to said second bus and being adapted to display the parallel data in the receiving data memory section and to allow input of instructions to control the analyzer;

a main control section, said main control section communicating with said second bus, whereby all operations of the analyzer may be controlled;

said receive signal processing section including a control counter for controlling an address where the parallel data is stored in the receiving data memory section, said counter counting after each store operation;

and said receive memory section including a managing data memory section under the control of which for each packet a memory address pointer indicating where the packet is stored is maintained, a packet length is measured and a packet time interval is measured whereby the data from said receive data memory section is analyzed relative to the packet length and packet time interval from said managing data memory section.

2. A local area network protocol analyzer as set forth in claim 1 further comprising a CRC check section for checking a CRC value of the packet to detect a transmission error.

3. A local area network protocol analyzer as set forth in claim 1 further comprising a filter section for selecting packets according to packet patterns specified by a user.

4. A local area network protocol analyzer as set forth in claim 1 wherein said code/decoder further comprises a broad band modem.

5. A local area network protocol analyzer as set forth in claim 1 wherein said code/decoder is provided in an exchangeable manner.

6. A local area network protocol analyzer as set forth in claim 1 further comprising a data sending control section to send back the packets received and stored to said coaxial cable and a code/encoder to encode said packets before being sent back thereto.

7. A protocol analyzer for analyzing packets on a local area network, comprising:
   a. an interchangeable code/decoder, said code/decoder translating the packets to a common digital logic form;
   b. a filter section having user selectable parameters, said filter section acting on the packets to admit or exclude packets from the analyzer based on said parameters;
   c. packet storage means, said packet storage means storing at an address each packet admitted to the analyzer;
   d. packet measurement means, said measurement means measuring a length of each packet and a time since the previous packet;
   e. measurement storage means, said measurement storage means storing, for each packet admitted, the address, the length and the time since the previous packet;
   f. packet control means, said packet control means controlling, for each admitted packet, the operation of said packet storage means, said packet measurement means, and said measurement storage means;
   g. main control means, said main control means controlling the code/decoder, the filter section and the packet control means, and being adapted to access the packet storage means and the measurement storage means independently of the packet control means and to generate a statistical measurement of network performance from the packets, lengths and times contained therein;
   h. output means, said output means adapted to display the statistical measurement; and
   i. input means, said input means being adapted to allow user control of the main control means and entry of the parameters, whereby said interchangeable code/decoder allows the analyzer to be used on different type networks by user selection of the code/decoder and said access of the packet storage means and the measurement storage means independently of the packet control means speeds up the generation of the statistical measurement.

8. An analyzer as in claim 7, further comprising a CRC check section for checking a CRC value of a packet.

9. An analyzer as in claim 7, wherein said code/decoder further comprises a broad band modem.

10. An analyzer as in claim 7, further comprising a packet retransmission section, said retransmission section controlled by the main control means and adapted to either loop back packets to the code/decoder or transmit packets into the network.

* * * * *

UNITED STATES PATENT AND TRADEMARK OFFICE
CERTIFICATE OF CORRECTION

PATENT NO.  : 4,792,753
DATED       : December 20, 1988
INVENTOR(S) : Kiyoshi Iwai It is certified that error appears in the above-identified patent and that said Letters Patent is hereby corrected as shown below:

Column 2, line 25 "token" should read --Token--.

Column 2, line 58 "converter to convert 19" should read --converter 19 to convert--.

Column 3, line 12 "Octets." should read --Octets,--.

Column 3, line 13 "Octets." should read --Octets,--.

Column 3, line 35 "sections" should read --section 5--.

Column 4, line 25 "interfac" should read --interface--.

Column 4, line 43 "of" should be omitted.

Column 6, line 57 "sid" should read --said--.

Signed and Sealed this

Twentieth Day of June, 1989

*Attest:*

DONALD J. QUIGG

*Attesting Officer*   *Commissioner of Patents and Trademarks*